United States Patent [19]
McCann

[11] Patent Number: 5,941,593
[45] Date of Patent: Aug. 24, 1999

[54] AERODYNAMIC VEHICLE COVERING SYSTEM

[76] Inventor: John C. McCann, 4034 Agua Dulce Blvd., La Mesa, Calif. 91941-7046

[21] Appl. No.: 08/911,256

[22] Filed: Aug. 14, 1997

[51] Int. Cl.⁶ ............................................. B60J 11/00
[52] U.S. Cl. ................................................. 296/136
[58] Field of Search .................. 296/136, 98

[56] References Cited

U.S. PATENT DOCUMENTS

| | | | |
|---|---|---|---|
| 2,751,977 | 6/1956 | Pinkerton | 296/136 |
| 2,801,667 | 8/1957 | Curran | 296/136 |
| 4,718,711 | 1/1988 | Rabbit | 296/136 |
| 5,040,557 | 8/1991 | Morgan | 296/136 X |
| 5,328,230 | 7/1994 | Curchod | 296/136 |
| 5,423,588 | 6/1995 | Eglinton | 296/136 X |

FOREIGN PATENT DOCUMENTS

| | | | |
|---|---|---|---|
| 3512271 | 10/1986 | Germany | 296/136 |
| 94008813 | 4/1994 | WIPO | 296/136 |

*Primary Examiner*—Joseph D. Pape

[57] ABSTRACT

An aerodynamically stable, form fitting, vehicle top covering system that includes a rectangular shape of fabric attached at opposite ends to spars. The ends of the spars are secured at the ends of the vehicle, typically under the corners of the bumpers, with self-retaining hook and strap assemblies. The spars may be designed to bend and thus create differential tensioning of the fabric by tensioning means, causing it to be draped over the top surfaces of the vehicle in a compound curved, aerodynamic configuration that does not require side tie-downs in cross winds. A self-retracting version has small diameter support extensions, at the ends of a roller spar, that allow extra space for the increased radial build-up of the cover's lateral seams.

8 Claims, 7 Drawing Sheets

COVER & SPAR SHOWN IN STOWED POSITION
(EXPLODED VIEW IS MIRROR IMAGED)

AERODYNAMIC VEHICLE COVERING SYSTEM

CROSS-REFERENCES

Patent Disclosures #408252 (Oct. 17, 1996), #401753 (Jul. 01, 1996), & #392167 (Mar. 18, 1996).

BACKGROUND OF THE INVENTION

Those skilled in the art will recognize that existing vehicle cover designs are beset with problems of bulk, cumbersomeness in deployment, excessive weight, aesthetically unmarketable, and/or excessive cost to manufacture. Full covers, with sides, offer protection to all surfaces albeit with the trade-offs of bulk, cost, and a timely and cumbersome deployment, storage & security procedures. Attempts to add convenience with rollers (U.S. Pat. No. 5,176,421; 5,056,839; 4,732,421; 1,912,231 and others) have resulted in large and costly designs which have covers that require folding several time longitudinally, thereby creating bulky, stiff, and costly configurations to roll up into a compact shape, as "idealized" in their patent figures.

The principal areas of a vehicle that are subject to incident solar radiation [infrared (IR) heating and ultra violet (UV) paint fading], bird droppings, and other foreign material deposits are the horizontal/top surfaces. Therefore, these are the primary surfaces to protect. Prior art designs, without sides, are costly and cumbersome (U.S. Pat. No. 4,174,134 & 3,222,102) or lacked a practical ease of rapid deployment, recovery or storage (U.S. Pat. No. 2,751,977 or 3,992,053).

Hybrid designs, such as U.S. Pat. No. 5,029,993, have limited coverage, lack ease of deployment & recovery and require side tie-downs to aerodynamically stabilize in high winds.

Attempts to achieve an ideal "one-man" design have been made (U.S. Pat. No. 5,378,035 & 5,294,167), but they can not be made wide enough for full horizontal protection or incorporate the necessary lateral edge seams or elastic members and thusly require additional side tie-downs to be stable in a cross wind as dictated by the limitations of their simple curved configuration, where no lateral over-hang can drape over the lateral edges of the top of a vehicle.

SUMMARY OF THE INVENTION

The Aerodynamic Vehicle Covering System, described herein, solves the aforementioned problems of the prior art. More specifically, but without limitation thereto, the present invention consists of a rectangular protective fabric cover for vehicles, boats and other property which compactly accordions, folds, or rolls up quickly and easily. The compactness and low inherent cost of the invention is due to the fact that it uses less than one-half of material required of covers with full sides, may be made from one continuous panel of fabric, and only a few sizes will fit most vehicles, no custom patterns being required.

Unique methods are provided which drapes the cover securely in a compound curved configuration over the complex upper shapes of vehicles, such as the hood, cab top and the trunk by means of an overhang in width such that the cover can drape over the lateral edges of top vehicle surfaces. This ability provides for superior aerodynamic stability in cross winds without the need for additional side restraints, with proper tensioning.

Each end of the cover is attached to a simi-rigid spar which speeds deployment & recovery and maintains the proper tension (shape) in the cover's material. The spar's flexibility is designed to aid in a differential tensioning of the fabric as to provide maximum protection against the sun by conforming to both the longitudinal and transverse curves of the vehicle top surfaces. The lateral edge seams are stiffer and may be optionally elasticized as to cause the sides to be tensioned higher than the center fabric in order to achieve the slightly compound curve shape from a flat length of fabric (the bending of one or both spars aids in the differential tensioning in the fabric). At the ends of the spar is an adjustable tie-down strap and hook which is typically secured under the corner of the vehicle's bumper where a thin edge is available to anchor the hooks, and which permits tension adjustment as described herein.

This invention is configurable in two principal versions, a BASIC version and a DELUXE version. The BASIC version uses two collapsible, simi-rigid deployment spars, each with two tie-down hooks. The DELUXE version uses one simi-rigid deployment spar with two tie-down hooks, and one simi-rigid roller spar assembly which may be secured to either end of the vehicle. A tubular housing contains the roller spar, torsion spring, bearings, spar end extension supports and the cover in their proper spatial positions. Each end of the roller spar is supported by a reduced diameter support extension and spherical bearing which allows for excess radial build up of the thicker lateral edge seams and any tension member(s) thus allowing for a smaller diameter housing and attendant improved aesthetics and marketability. The end caps provide a mounting for the support extensions and also may provide for mounting and storage of tension members to aid in properly tensioning of the cover's lateral edge seams to the roller spar's housing.

The roller spar may be made from a simi-rigid, tubular material (such as PVC water pipe). This will allow the roller spar to bend when deployed and provide differential tensioning to the cover. The ability of the roller spar's stub shafts to bend, slide, and rotate is allowed for by spherical bearings positioned at the end of the spar end support extensions (the bearings allow spar axial rotation during deployment, spar stub shaft pivoting when the spar flexes it deployment, and sliding of the spar stub shafts as the effective horizontal width, or cord length, shortens during spar flexing). The OD of the roller spar may be increased with the use of a tubular foam sleeve as required. This reduces the number of revolutions the torsion spring is required to make in deploying the cover (without adding bending stiffness to the roller spar).

Selection of fabric, in the DELUXE version, may result in conflicting requirements of spar flexibility to achieve differential tensioning of the cover fabric and spar stiffness to avoiding wrinkling during roller spar recovery. The use of a non-circular (cross section) spar allows both requirements to be satisfied by rotating the deployment spar 90 degrees, about its long axis, to change its functional stiffness.

Additionally, battens may be affixed to the cover material requiring means to prevent excessive wrinkling from occurring when the cover is retracted into the roller spar housing. The roller spar end of the cover may be attached to the roller spar with screws to facilitate easy removal for cleaning or replacement of the cover.

The deployment spar tie-down hooks can be equipped with a pretensioned tang which holds the hook to the bumper in any position (even though there may be no initial tension in the hold-down straps as required to secure conventional open hooks). Hook handles can also be provided for convenience. The tie-down straps can be elasticized for automatic tensioning of the cover.

In the BASIC version, to inhibit theft, a flat, cut resistant tether (secured at one end to lateral seam) may be provided to be clamped by one of the vehicle's upper door jamb (pull-through is avoided by a thickened free end).

In is BASIC version, the deployment spars are made more convenient to handle and store being made to interlocking sections as to produce a compact shape.

The DELUXE version roller spar assembly may be resiliently mounted to the vehicle (typically at the bumper) as to allow the roller assembly to deflect horizontally. Such deflection is valuable to allow additional clearance when opening the vehicle's trunk or when deflected by contact with another object (as in parking, etc.).

In practice, the DELUXE version is operated as follows: starting with the cover being stowed, the two tie-downs are released and the deployment spar is picked up and passed over the vehicle from one end to the other until the opposite end bumper is reached. The operator then attaches the tie-downs under the bottom corner of the bumper. The anti-theft tether is then trapped between the driver's door and the door jamb, which locks the tether in place. Thus deployed is under 30 seconds, the vehicle operator has completed the cover's deployment. The stowage or retraction of the cover is the reverse of the aforementioned deployment, with two cautions. Firstly, the deployment spar must be held "flat" or horizontal during recovery to maintain an even tension across the width of the cover as it is being wound on to the roller spar. This will minimize wrinkling. Secondly, the operator must keep the center of the deployment spar over the centerline of the vehicle during recovery to avoid jamming the cover into one end of the roller housing.

The BASIC form is designed to be lower in cost, easier to deploy, and more practical than prior art designs.

The DELUXE version is designed to optimize convenience, protection, cost, and aesthetics. Both versions allow all-door access into the vehicle with the cover deployed.

BRIEF DESCRIPTION OF THE DRAWINGS

FIG. 1A is an exploded perspective view of the theft deterrent tether.

DESCRIPTION OF THE PREFERRED EMBODIMENT

Figure 1:
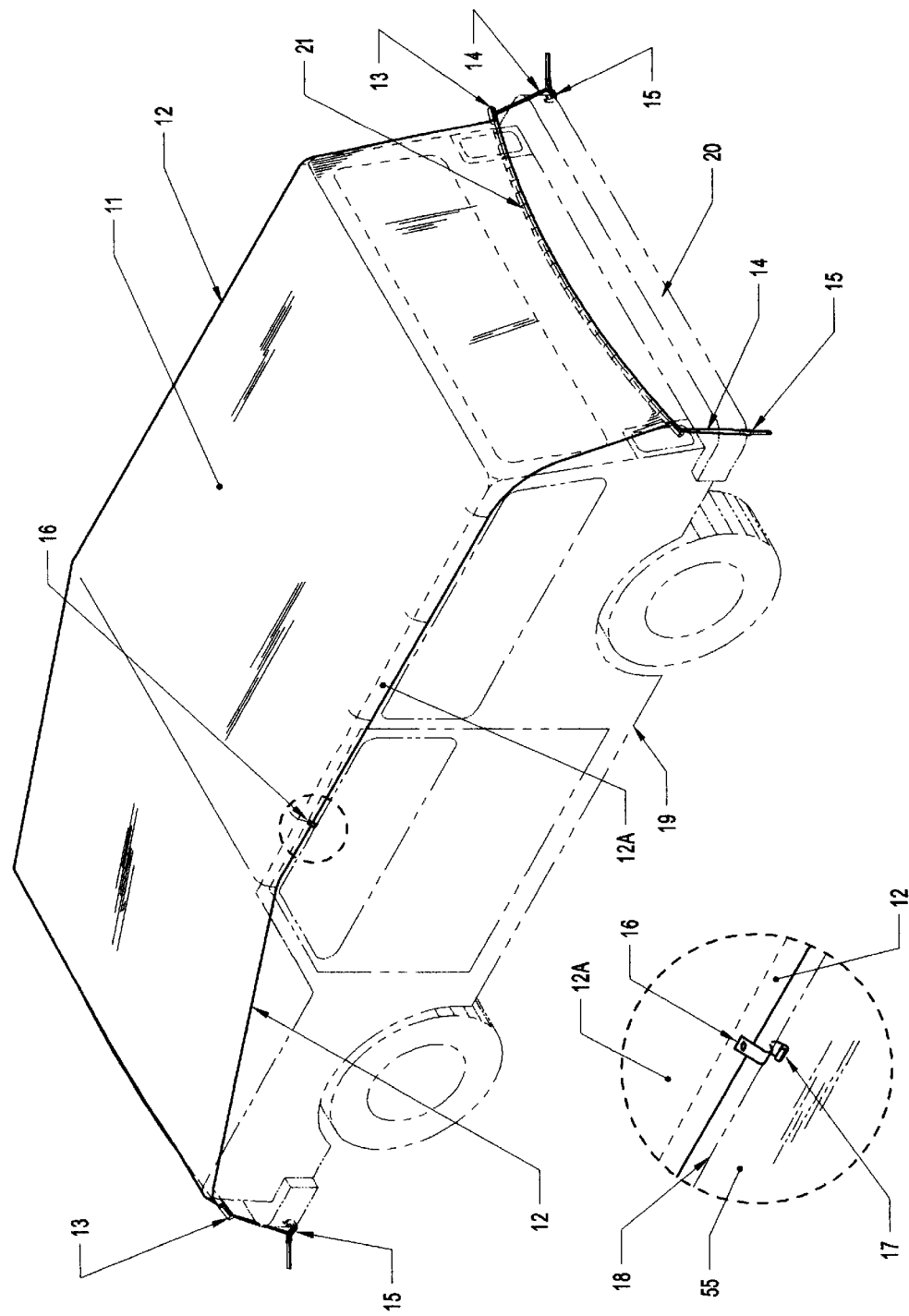
FIG. 1 is a perspective view of the cover in its BASIC version with a simi-rigid spar fixed to the cover fabric at each end.

FIG. 1 shows the BASIC version of the preferred embodiment of this invention. The device includes a cover 11 which has reinforced lateral edge seams 12. The ends are reinforced by transverse seams 21 containing spars 13. Attached to each end of the spars is a tie-down 14 and hook 15 which is typically attached to the bottom corner of the vehicle's bumper 20. The spars 13 are simi-rigid and load the cover 11 as to be draped over the top lateral edges of a vehicle 19 in a snug manner with lateral edge over-hangs 12A that conform over and down the sides of the vehicle 19 a short distance (about 3–4 inches, for example).

FIG. 1A shows an enlarged view of an anti-theft tether 16 which is affixed to the lateral edge seam 12. The free end is thickened to provide an anti-pull out stop 17. The stop 17, viewed through the door window glass 55, prevents the tether from being pulled through the upper door jamb 18 which entraps the tether 16.

Figure 2:
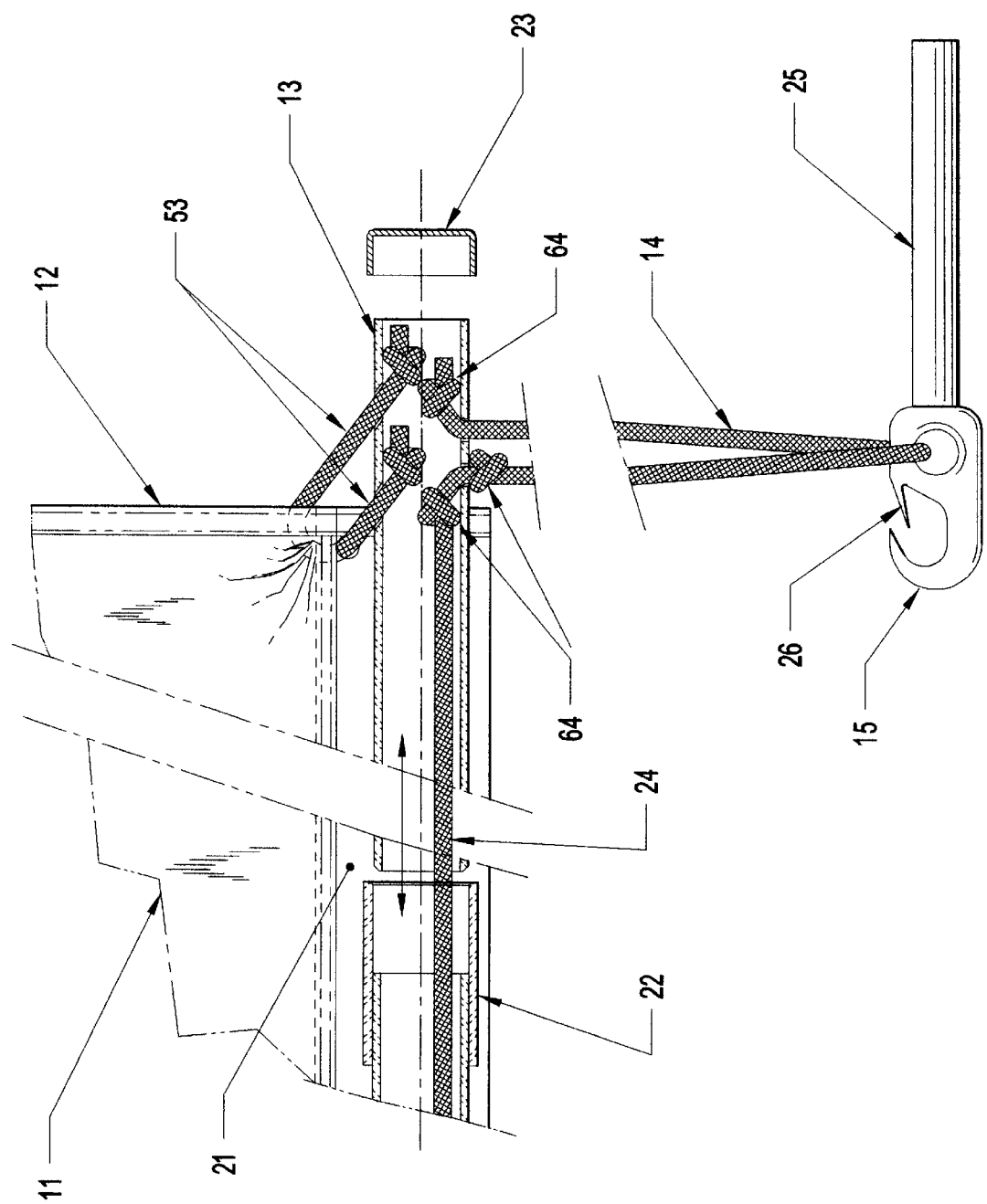
FIG. 2 is a detailed cross section of a corner of the cover and tie-down assemblies of the BASIC version.

FIG. 2 is a detailed cross section of the construction of the corner of the cover and tie-down assemblies. The cover 11 includes reinforced lateral edge seams 12 and transverse pocket(s) 21 containing the simi-rigid spar 13, a spar joint or hingable coupling 22 and end cap 23. The spar 13 "folds" or divides in half, utilizing a slip joint coupling 22 and tensioner 24. The tie-down 14 and the hook 15 secure the cover. The hook 15 is fitted with a handle 25 and a flexible hook tang retainer 26 for convenience. Knots 64 may be used for economically anchor the tie-down strap 14 and tensioner 53 when "shock" cord is used.

Figure 3:
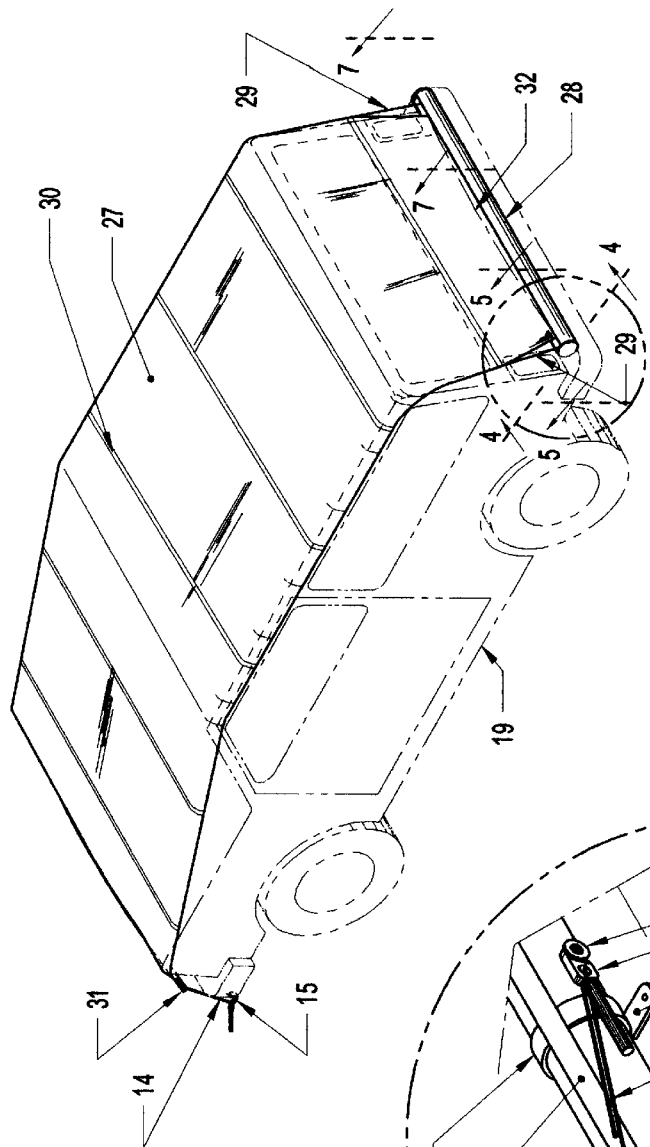
FIG. 3 is a perspective view of the cover in its DELUXE version where one spar is configured into a roller, showing the roller spar & housing assembly, bumper mounting structure, and mounting point for the tie-down hooks.

FIG. 3 is a perspective view of the DELUXE version of the invention. The construction of the cover 27 is similar to the BASIC version at the deployment spar 31 end. The opposite end contains the roller spar & housing assembly 28. To properly drape the cover 27 over the vehicle's 19 top surfaces, a cover lateral edge seam tensioner or restraint 29 can be provided. Additionally, some cover material(s) may require battens 30 to provide transverse tensioning and prevent excessive wrinkling when being retracted into the rotary spar & housing assembly 28. The center or the simi-rigid roller spar 32 bends or deflects out of its housing when deployed under lateral tension. This deflection is caused by the uniformly tension of the cover 27 being reacted at the ends of the roller spar 32, while the center of the spar is unsupported (see views 5 & 7). Views 4, 5 & 7 provide detailed cross sections of the roller spar & housing assembly 28.

Figure 3A:
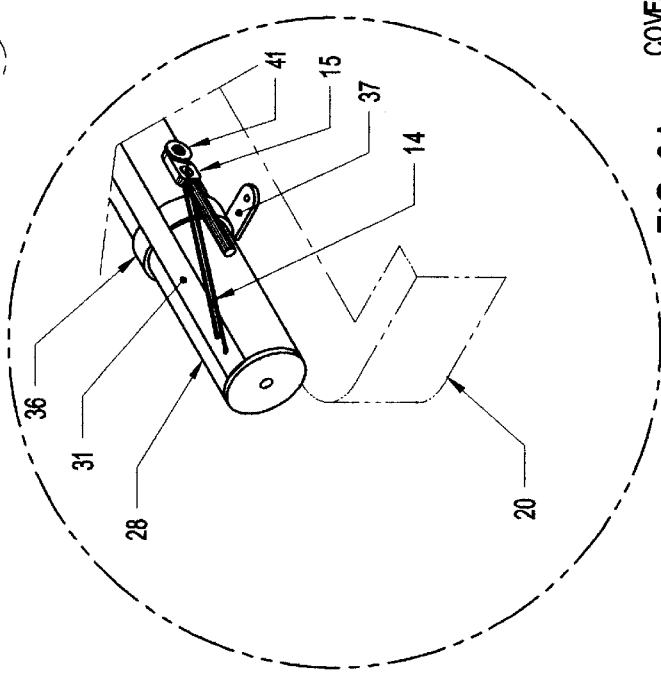
FIG. 3A is an exploded perspective view of the end of the roller spar assembly (cover and spar shown in stored position). View is a mirrored to show details of bumper mounting and storage of tie-down hook.

FIG. 3A is an exploded perspective detail of the end of the roller housing assembly 28, showing the cover and spar 31 in the stowed position. The view is mirrored to show the bumper 20, mounting tab 37, deployment spar tie-down 14, hook 15, and anchor 41 arrangement. The tie-down's tension path counters the cover's closing tension and thus keeps the deployment spar 31 securely in position.

Figure 4:
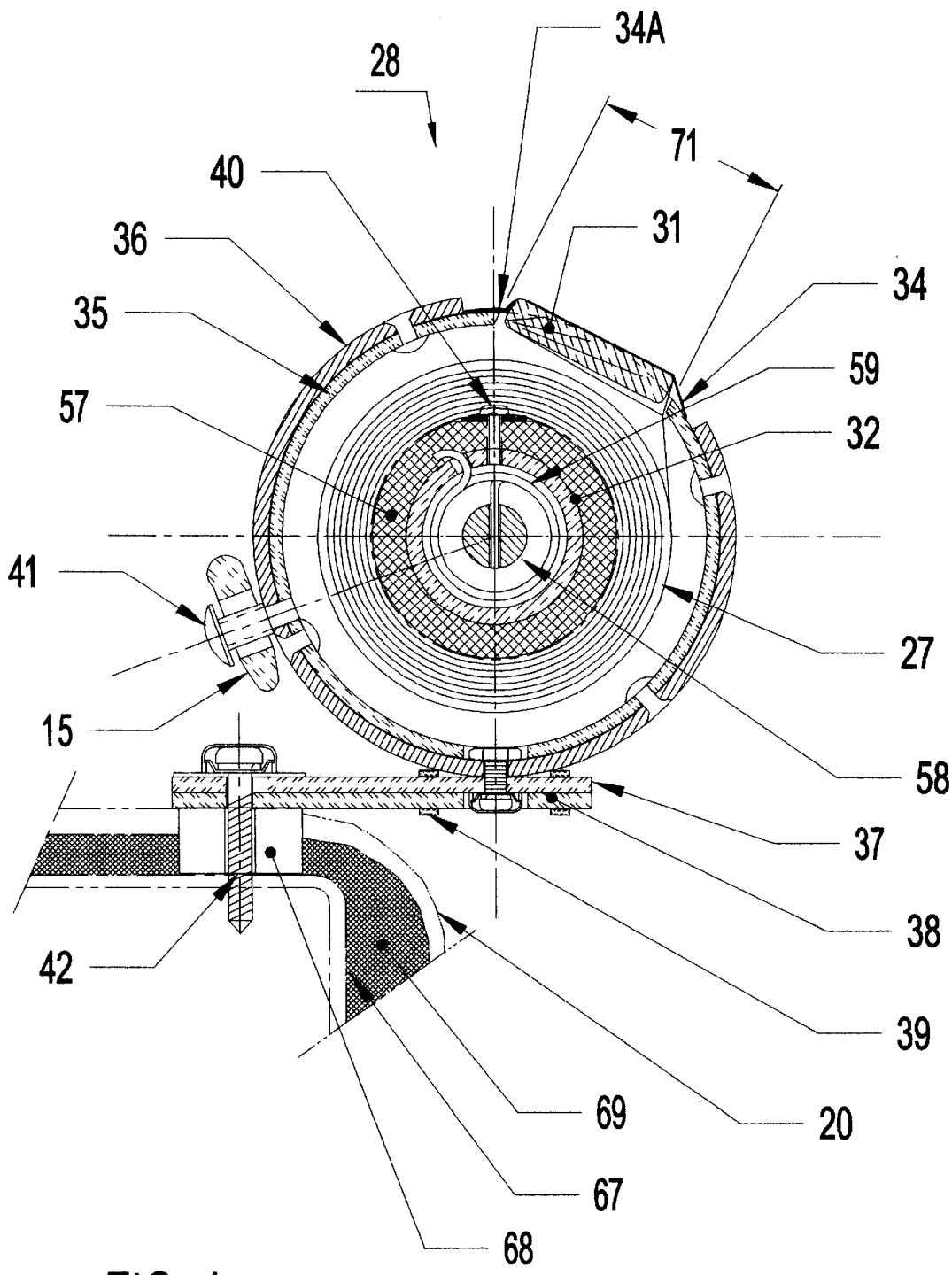
FIG. 4 is a longitudinal cross-section of the roller spar assembly, housing, mounting, and optional mounting of tensioning member.

FIG. 4 is a longitudinal cross section view of the DELUXE roller spar & housing assembly in the stowed position. The roller spar 32 contains, at one end, a torsion spring 59 and may be covered with a flexible foam sleeve covering 57. The hollow, simi-rigid spar 32 is supported at each end by a roller spar extension 33 (see FIG. 5) & stub shaft 62. The cover 27 wraps around the roller spar 32, spring 59, spring mandrel 58, and foam covering 57 in the stored condition. The opposite end of the cover 27 terminates around the deployment spar 31 which is seated into a longitudinal opening 71 in the roller spar housing 35. A weather cap 34 may be fitted to the spar 31 to cover the opening 71 in the housing 35. Optionally, a weather seal may be fitted to the slot 34A. The housing 35 is supported by circular mounting supports 36 which are affixed to the bumper mounting tabs 37 and 38. Multiple mounting tabs 37 and 38 may be used to provide for both a strong and flexible means of mounting to the vehicle's bumper 20. To minimize vertical flexing from road vibration, the tabs 37 and 38 are clamped together by straps 39. The cover 27 may be affixed to the roller spar 32 with screws 40. A storage lug 41 is provided near each end of the housing 35 to secure the tie-down hook 15 in such an arrangement that the hook 15 and deployment spar 31 will not become unseated during vehicle motion. The roller spar & housing assembly mounting tabs are attached to the vehicle's bumper 20 with a screw 42. Alternately, as with modern padded bumpers having and internal strength member 67, attachment through the padding 69, requires a spacer 68.

Figure 5:
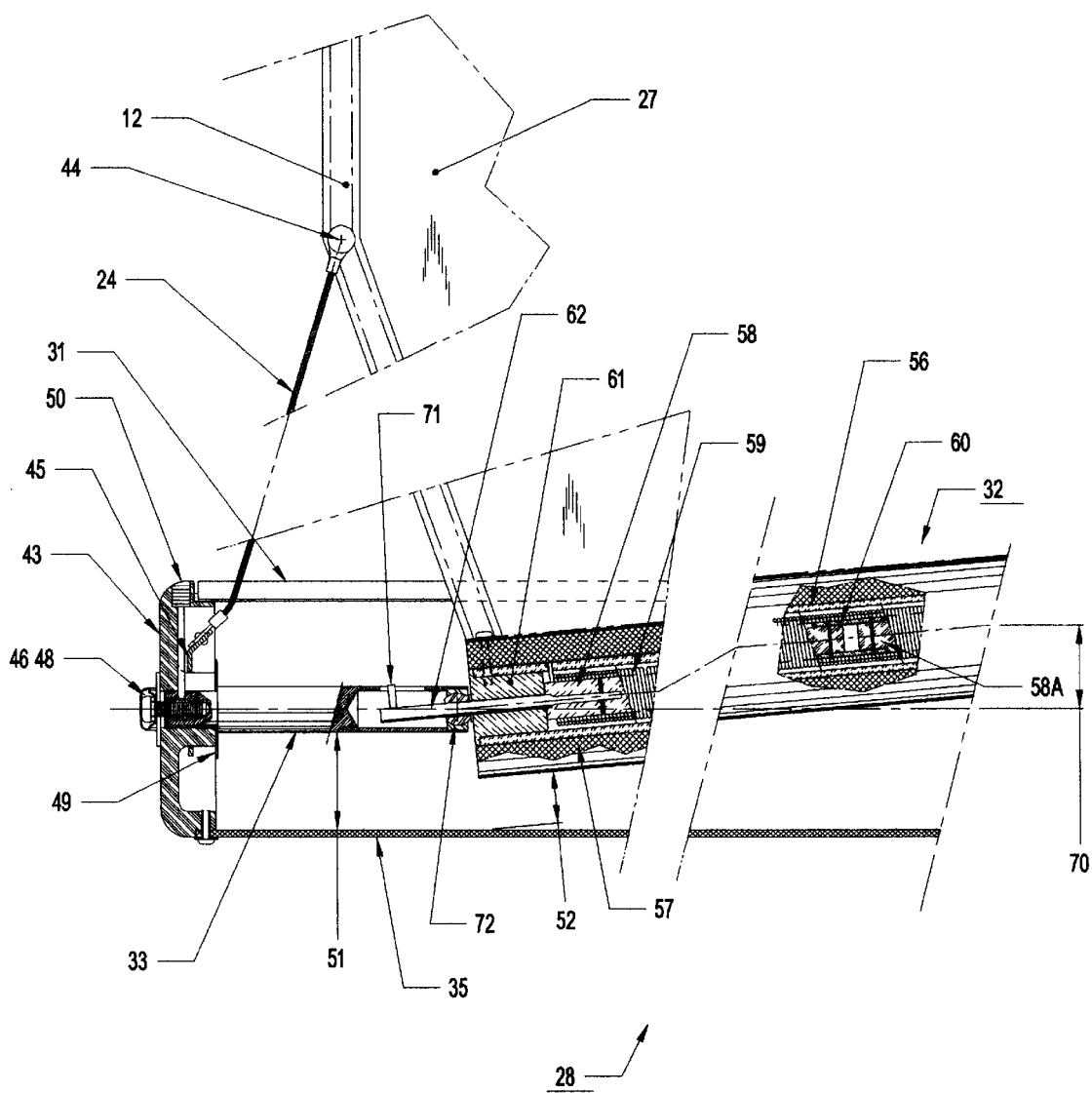
FIG. 5 is a transverse cross-section detail of the end of DELUXE version's roller spar with torsion spring mechanism.

FIG. 5 is a partial transverse cross section of one end of the roller spar and housing assembly. The end of the roller spar assembly 32 is supported by the extension 33 and end cap 43 which is affixed to the housing 35 by means of a retaining screw, washer and screw cover 46, 47, & 48 anti-rotation pin 50. To aid in tensioning the cover 27 and lateral edge seam 12, a cover tensioner 24 is affixed 44, at one end, to the lateral edge seam 12 and the end cap 43, at the other end, by means of a rotating anchor ring 45. The ring 45 allows the tensioner 24 rotate freely as the cover 27 is wound onto and off of the spar 32. The ring 43 is retained by washer 49. The radial distance 51, between the spar extension 33 and the inside of the housing 35, is typically twice of the radial distance 52 between the spar 32 and the inside of the housing 33. The roller spar assembly 32 is made up of a tubular core tube 56, a foam sleeve 57, a spring mandrell 58 & 58A joined by a flexible coupling 60, a torsion spring 59, a bearing 61, a spring mandrel torsion stub shaft 62 with its anti-rotation pin 71, located in a slot in the roller extension 33 (to react the torsion of the spring). The torsion spring 59 being affixed to the spar 32 at one end and a slot in the end of the spring mandrel 58A at the opposite end, in the conventional "window roller shade" manner (see FIG. 4). The roller spar is allowed to bend and rotate (at each end) by the spherical bearing 72 affixed to the end of the extension support 33. When deployed, the lateral tension of the cover 27, causes the center portion of the roller spar 32 to deflect as shown by the centerline deflection distance 70 out of the roller assembly 28. The deployable end of cover 27 is attached to a simi-rigid spar 31 (see FIG. 3 & 4) which seats into a longitudinal slot in housing 35 (see FIG. 4).

Figures 6, 6A:
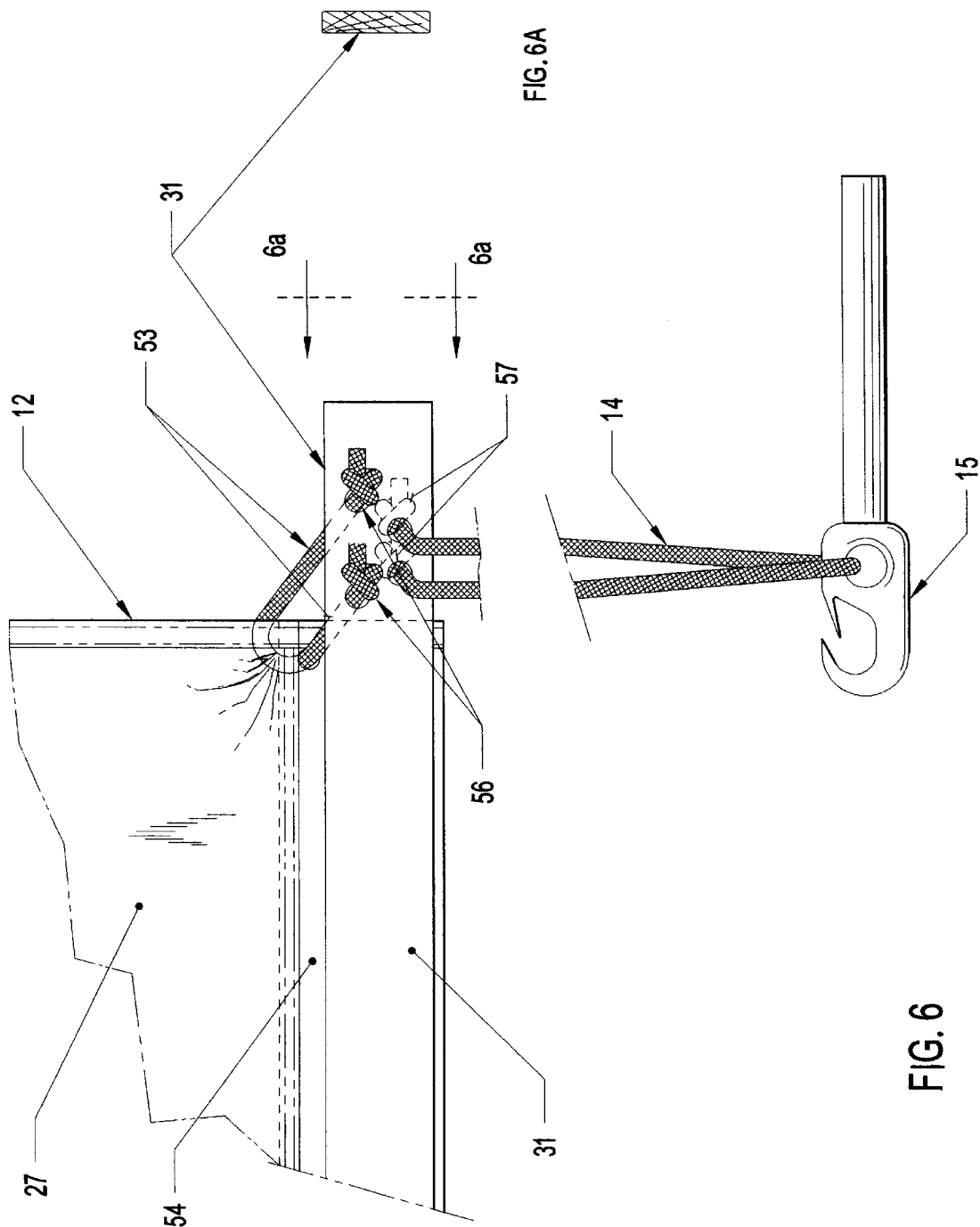
FIG. 6 is a detailed cross section view of the cover and deployment spar of the DELUXE version (the deployment spar is shown in the stowed/retracted position).
FIG. 6A is a cross-sectional view of the deployment spar.

FIG. 6 is a detail of the deployment spar for the DELUXE version of the invention. The spar 31 is typically positioned inside of a transverse cover seam 54. The cover transverse tensioner 53 aids in proper transverse tensioning of the cover 27. At each end the spar 31 anchors the cover transverse tensioners 53 and the tie-down straps and hook 14 & 15.

FIG. 6A shows the non symmetrical cross-section of the deployment spar 31.

Figure 7:
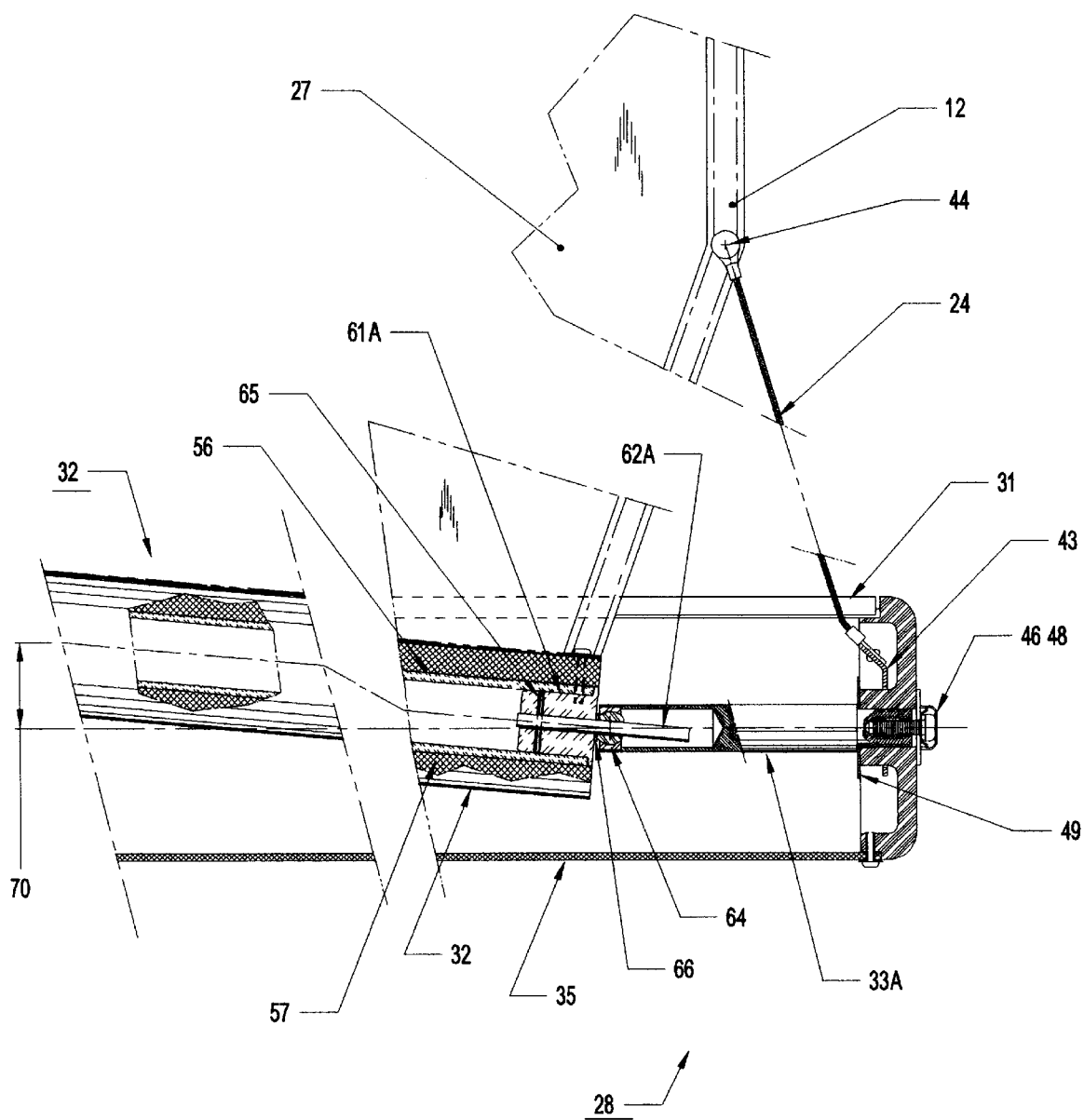
FIG. 7 is a transverse cross-section detail of the end of DELUXE version's roller spar without torsion spring mechanism.

FIG. 7 shows a longitudinal cross-section of the rotary spar & assembly 28 at the end without the torsion spring 59 (as shown at opposite end with torsion spring in FIG. 5). The spar assembly 32 is supported by means of a fixed stub shaft 62A which is fixed to plug 61A by means of a press fit or pin 65. Extension 33A is not required to have the anti-rotation pin and slot 50 & 63 shown in FIG. 5. In other respects, this end is similar to the end fitted with the torsion spring (except that it does not have to be hollow).

With this invention thus explained, it is apparent that numerous modifications and variations can be made without departing from the scope and spirit of this invention. It is therefore intended that this invention be limited only as indicated in the appended claims.

I claim:

1. A vehicle covering system comprising:

an elongated rectangular panel of fabric dimensioned to extend over the top of said vehicle, substantially between bumpers with said cover having its transverse width slightly wider than said top of said vehicle to provide an overhang on each lateral side;

said elongated rectangular panel having a front end that is folded back upon itself and transversely stitched to form a front tubular sleeve; said elongated rectangular panel having a rear end that is folded back upon itself and transversely stitched to form a rear tubular sleeve; said elongated rectangular panel having left and right edges having reinforced lateral edge seams extending longitudinally all the way from said front tubular sleeve to said rear tubular sleeve;

an elongated semi-rigid spar member received in each of said front and rear tubular sleeves of said rectangular panel; each of said spar members having an outer left end and an outer right end;

means for transversely tensioning said respective front and rear ends of said rectangular panel outwardly along the lengths of their respective spars thereby keeping said respective tubular sleeves extended in a taut condition while also transmitting a lateral tension load created along each of the respective right and left edges of said rectangular panel to the respective ends of said spars; and means for affixing the respective ends of said spars to said vehicle's front and rear bumper assemblies by exerting tension on said lateral edge seams of said panel, whereby said panel is caused to conform substantially to said vehicle's top surfaces and whereby said lateral edge seams are wrapped along and down the upper sides of said top of said vehicle.

2. The invention according to claim 1 wherein one end of a cut resistant tether is affixed to one of said lateral edge seams, the opposite end of said tether being thickened to provide an anti-pull out stop.

3. The invention according to claim 1 wherein said lateral edge seams are elasticized along the length of said panel to facilitate longitudinal adjustment.

4. The invention according to claim 1 wherein said spars have a disconnectable joining structure as to allow said spars to be disconnected into separate halves for compact storage.

5. The invention according to claim 1 wherein said spars are formed of telescopic members to allow their length to be reduced more compactly for storage.

6. The invention according to claim 1 wherein said spars are hollow.

7. The invention according to claim 1 wherein said means for affixing the ends of said spars to said bumper consists of an adjustable strap and hook.

8. The invention according to claim 1 wherein said means for affixing the ends of said spars to said bumper consists of an adjustable strap and hook, wherein said strap consists of an elastic cord.

* * * * *